(12) United States Patent
Zadorozhny

(10) Patent No.: US 7,933,861 B2
(45) Date of Patent: Apr. 26, 2011

(54) PROCESS DATA WAREHOUSE

(75) Inventor: Vladimir Iosifovich Zadorozhny, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 526 days.

(21) Appl. No.: 12/099,603

(22) Filed: Apr. 8, 2008

(65) Prior Publication Data

US 2008/0250058 A1   Oct. 9, 2008

Related U.S. Application Data

(60) Provisional application No. 60/922,478, filed on Apr. 9, 2007.

(51) Int. Cl.
*G06F 17/30* (2006.01)
(52) U.S. Cl. ...................................................... 707/600
(58) Field of Classification Search .................. 707/600, 707/602, 999.1
See application file for complete search history.

(56) References Cited

U.S. PATENT DOCUMENTS

| | | | |
|---|---|---|---|
| 7,003,560 B1 * | 2/2006 | Mullen et al. | 709/223 |
| 7,007,020 B1 * | 2/2006 | Chen et al. | 1/1 |
| 7,571,191 B2 * | 8/2009 | Dill et al. | 1/1 |
| 2002/0077790 A1 * | 6/2002 | Bisgaard-Bohr et al. | 703/2 |
| 2005/0075832 A1 | 4/2005 | Ikeguchi et al. | |
| 2007/0043696 A1 | 2/2007 | Haas et al. | |

OTHER PUBLICATIONS

International Search Report and Written Opinion dated Aug. 15, 2008 for PCT Application Serial No. PCT/US2008/59781, 9 Pages.

* cited by examiner

*Primary Examiner* — Cheryl Lewis
(74) *Attorney, Agent, or Firm* — Kegler Brown Hill & Ritter LPA; James J. Pingor

(57) ABSTRACT

Systems and/or methods are presented that can efficiently analyze and summarize large collections of data. A summarization component can employ mapping rules to map received data into specified states and observations of interest, which can be utilized to facilitate creating relational tables that can be utilized to facilitate summarizing a collection of data based in part on predefined summarization criteria. An optimizer component can employ pre-computing and materialization of the process behavior to facilitate optimizing data analysis. An adaptor enhancer component can monitor and evaluate system performance and can generate mapping rules that can facilitate improving system performance.

20 Claims, 9 Drawing Sheets

PROCESS DATA WAREHOUSE

CROSS-REFERENCE TO RELATED APPLICATION

This application claims the benefit of U.S. Provisional Patent application Ser. No. 60/922,478 entitled "PROCESS DATA WAREHOUSE" and filed Apr. 9, 2007. The entirety of the above-noted application is incorporated by reference herein.

TECHNICAL FIELD

The subject innovation generally relates to data warehouses and in particular to systems and methods that can facilitate efficient summarization of large data sets.

BACKGROUND

Computing and network technologies have transformed many aspects of business and everyday life. The amount and value of data available is increasing rapidly due in part to rapid spread of computers and information technology. Typical large enterprises can have approximately a petabyte of operational data stored in over 1,000 data repositories supporting over 5,000 applications. Data storage volumes grow in excess of 50% annually. Workloads from online transaction processing (OLTP) over large databases are growing at over 60% per year. Repositories for decision support systems, which often contain replicated data, grow two to three times as fast as databases used for OLTP. This growth is expected to continue due to new Web based systems, increased access to existing systems, and the introduction of new sources of data.

It is desirable to be able to manage data collections that are continuously growing. It is also desirable to be able to quickly and efficiently derive pertinent information from large collections of data. Further, it is desirable to discover trends in dynamic data associated with complex processes.

SUMMARY

The following presents a simplified summary in order to provide a basic understanding of some aspects of the disclosed subject matter. This summary is not an extensive overview of the disclosed subject matter and is not intended to identify key/critical elements or to delineate the scope of such subject matter. Its sole purpose is to present some concepts in a simplified form as a prelude to the more detailed description that is presented later.

Systems and/or methods are presented that can facilitate efficiently summarizing large collections of data. In one aspect, a summarization component can receive an input data stream associated with a collection of data (e.g., a large collection of data) and can summarize the data (e.g., generate a relational synopses) based in part on predefined summarization criteria. The summarization component can employ a declarative framework based in part on a highly summarized relational synopses that can reflect constraints of the data sets in terms of probabilistic states, transitions, and observations. The summarization component also can employ a set of techniques that can efficiently generate a relational synopses from raw data (e.g., collection of data). The summarization component can facilitate performing updates to the relational synopses so that the relational synopses can remain current and accurate. The summarization component also can effectively estimate non-obvious data trends to facilitate data-driven decision making.

In accordance with an embodiment, the summarization component can employ a portable Structured Query Language (SQL) framework that can facilitate performing data analysis of a collection of data to generate and maintain a relational synopses. In accordance with another embodiment, the summarization component can employ an optimizer component that further optimize data analysis based in part on pre-computing and materialization of the process behavior in the declarative framework of the summarization component. The summarization component also can comprise an adaptor enhancer module that can monitor and evaluate performance of functions associated with summarizing data and can facilitate adaptively tuning the summarization component to improve performance and efficiency as well as facilitate accommodating high data loads.

To the accomplishment of the foregoing and related ends, certain illustrative aspects are described herein in connection with the following description and the annexed drawings. These aspects are indicative of various ways in which the disclosed subject matter may be practiced, all of which are intended to be within the scope of the disclosed subject matter. Other advantages and novel features may become apparent from the following detailed description when considered in conjunction with the drawings.

DETAILED DESCRIPTION

The various aspects of the disclosed subject matter are now described with reference to the annexed drawings, wherein like numerals refer to like or corresponding elements throughout. It should be understood, however, that the drawings and detailed description relating thereto are not intended to limit the disclosed subject matter to the particular form disclosed. Rather, the intention is to cover all modifications, equivalents, and alternatives falling within the spirit and scope of the disclosed subject matter.

Many data collections, such as those that can be found in repositories, continue to grow significantly. Data analysis of large collections of data can be challenging. It is desirable to be able to quickly and efficiently derive pertinent information from large collections of data. Further, it is desirable to discover trends in dynamic data associated with complex processes.

Systems and/or methods are presented that can facilitate efficiently summarizing large collections of data. A summarization component can receive a data stream and can employ mapping rules to map the received data stream into specified states and specified observations of interest. The summarization component can create, load, and maintain a process operational database (PODB) that can store process states and observations associated with the received data in a relational format. The summarization component also can create, load, and maintain a process analytical database (PADB), where the PADB can summarize the data from the PODB in the form of probabilistic relational synopses. The summarization component can aggregate the process dynamics by pre-computing state forwarding using information in the PADB tables. The summarization component also can perform de-reification of observations to promote process observation from the data level to the schema level, and can perform data analysis of the received data using de-reified observation tables. An optimizer component can further optimize the data analysis using de-reified observation sequences. An adaptor enhancer component can be employed to monitor and evaluate performance of functions associated with summarizing data. The adaptor enhancer component can facilitate generating mapping rules to adaptively tune the summarization component based in part on predefined summarization criteria.

Figure 1:
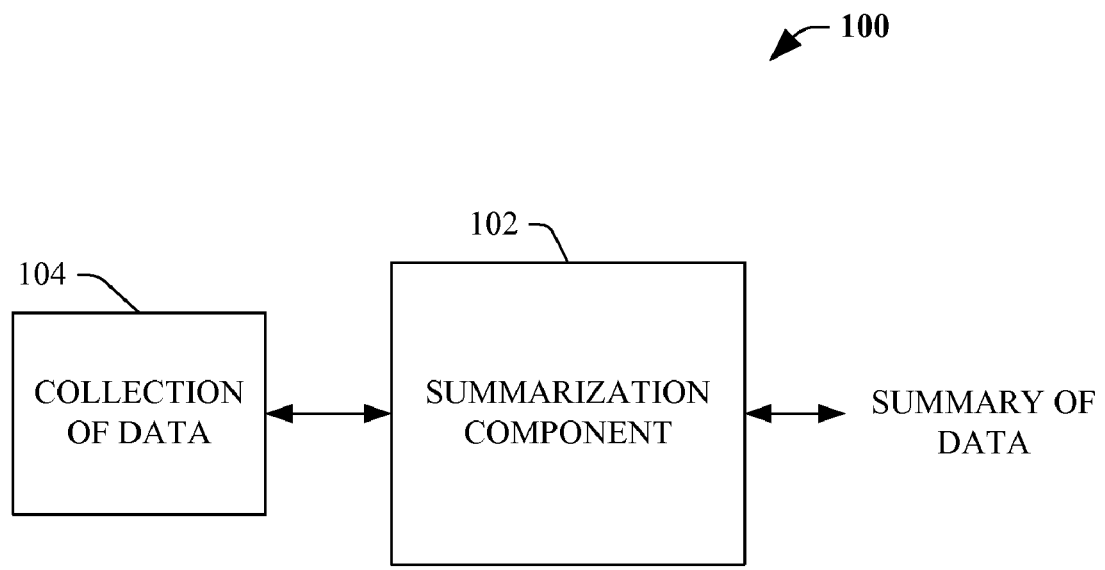
FIG. 1 illustrates a block diagram of a system that can facilitate summarization of a collection of data in accordance with an aspect of the disclosed subject matter.

FIG. 1 illustrates a system 100 that can facilitate summarization of a collection of data in accordance with an aspect of the disclosed subject matter. In accordance with one aspect, the system 100 can include a summarization component 102 that can facilitate efficiently analyzing and summarizing data, such as a large collection of data 104, based in part on predefined summarization criteria, and can provide summary data (e.g., a relational synopses) as an output. The collection of data can be a repository or database, wherein a large amount of data can be stored, a collection of sites (e.g., collection of web sites associated with the Internet), and/or can be a live data stream, for example. The summarization component 102 can receive an input data stream from the collection of data and can perform a multistage summarization of the received data to facilitate analyzing dynamic trends in the environment that produced the input data stream.

In accordance with an embodiment, the system 100 can be a process data warehouse (PDW) that can perform data processing and summarization functions using relational representation of the process data by employing generic and portable Structured Query Language (SQL). It is to be appreciated that, while the disclosed subject matter is described herein with regard to SQL code, the subject innovation is not so limited, as the subject innovation can be ported or associated with virtually any relational database management system (RDBMS).

In one aspect, the summarization component 102 can employ mapping rules that can facilitate mapping the input data stream into distinct states and observations of interest. The mapping rules can facilitate controlling the number of states and observations considered by the summarization component 102. In one aspect, the mapping rules can be provided to the summarization component 102 by a user. In another aspect, the summarization component 102 can monitor and evaluate performance of various functions by the summarization component 102 with respect to the input data stream and can facilitate dynamically adapting the mapping rules (e.g., add, remove, and/or adjust mapping rules) based in part on predefined summarization criteria to facilitate tuning or refining the summarization component 102 in order to maintain a desirable level of efficiency with regard to time, cost, and accuracy, as the summarization component 102 can recommend that a user modify mapping rules (e.g., adding, removing, and/or adjusting mapping rules) based in part on such performance evaluation.

The predefined summarization criteria can relate to, for example, an amount of time associated with the data analysis, cost associated with the data analysis, complexity of the data analysis, the number and/or size of higher order de-reified sequence tables, the number of states, the number of observations of interest, the amount of data in the collection of data to be analyzed and summarized, the resources available (e.g., processing power available) for performing the data analysis, accuracy of the model, size of the PDW (e.g., summarization component 102), complexity of the query processing, etc.

In accordance with another aspect, the summarization component 102 can utilize the defined states and observations of interest associated with the input data stream to generate a process operational database (PODB) comprising a specified number of relational tables, including, for example, an all_states table that can include information representing states generated from applying the mapping rules to the input data stream; an all_observations table that can include information representing observations generated from applying the mapping rules to the input data stream; a st_observ table that can contain information representing all state/observation pairs extracted from the input data stream; a st_trans table that can include information representing all state-to-state transitions extracted from the st_observ table, where a state-to-state transition can be a pair of state names (st1, st2) such that st2 occurs immediately after st1 in two consecutive records of the st_observ table; and an init_states table that can include information regarding states associated with the input data stream at the start of the process monitoring periods.

In yet another aspect, using information stored in the relational tables of the PODB, a process analytical database (PADB) can be created and can include a specified number of relational tables. For instance, the PADB can include an init_prob table that can contain information representing the initial state probabilities associated with the input data stream; a trans_prob table that can include information representing the state transition probabilities associated with the input data stream; and an obs_prob table that can include information representing the probability of associated state/observation pairs with regard to the input data stream.

In still another aspect, using information from the PADB, the summarization component 102 can generate a forward table that can contain information representing pre-computed combined probabilities, such as combined probability p(S1, S2, O), which can be the combined probability of transitioning from state S1 to state S2 in an observation O, associated with the input data stream. The summarization component 102 can perform de-reification of observations, where information in the forward table can be utilized to facilitate generating tables that can contain information n combined probabilities for each observation of interest obs. The summarization component 102 can determine the probabilities of the observation of interest obs in all initial states and combined probabilities of the observation of interest obs resulting from transition between each pair of states, where each observation of interest obs can correspond to de-reified observation tables comprising an init_obs table that can store probabilities of the observation of interest obs in all initial states associated with the input data stream; and a tr_obs table that can store combined probabilities of the observation of interest obs resulting from transition between each pair of states associated with the input data stream.

The term "reification" specifies the act of making an explicit data representation for an abstract concept. Thus, reification can allow a database system to process an abstract concept as if it were ordinary data. In the subject innovation, the concept of observation is first ratified from an abstract level to a data level and represented as attribute values in the summarization component 102. A database schema object (e.g., table) is created for each observation in the database. In this way, the de-reification of the observation data is performed, since the next abstraction level following the data level is a database schema.

Performing probabilistic analysis over sequences of observations can be equivalent to performing multiway joins over corresponding de-reified observation tables. De-reified observation tables can be used to perform the analysis of the input process data. In particular, the summarization component 102 can utilize the de-reified observation tables (e.g. init_obs table, tr_obs table) to facilitate computing probabilities of specific sequences of observations and the most likely sequence of states given a sequence of observations. The subject innovation, employing the summarization component 102, can facilitate reducing the probabilistic analysis over sequences of observations to performing multiway joins over corresponding de-reified observation tables.

In still another aspect, the summarization component 102 can further optimize the data analysis related to the input data stream by pre-computing probabilities of observation sequences and corresponding state transitions in higher order tables. The summarization component 102 can facilitate generating intermediate tables for each step of the sequence, similar to a forward procedure. The summarization component 102 can define intermediate tables as relational views and the entire process can be implemented via a chain of nested views that can correspond to each intermediate step. Any of the intermediate views can be materialized to further improve query performance. Using the intermediate views for the de-reified observation sequences, the summarization component 102 also can perform other data analysis. For example, the summarization component 102 can determine the most probable sequence of states that produces a particular observation sequence in accordance with the Viterbi algorithm.

Figure 2:
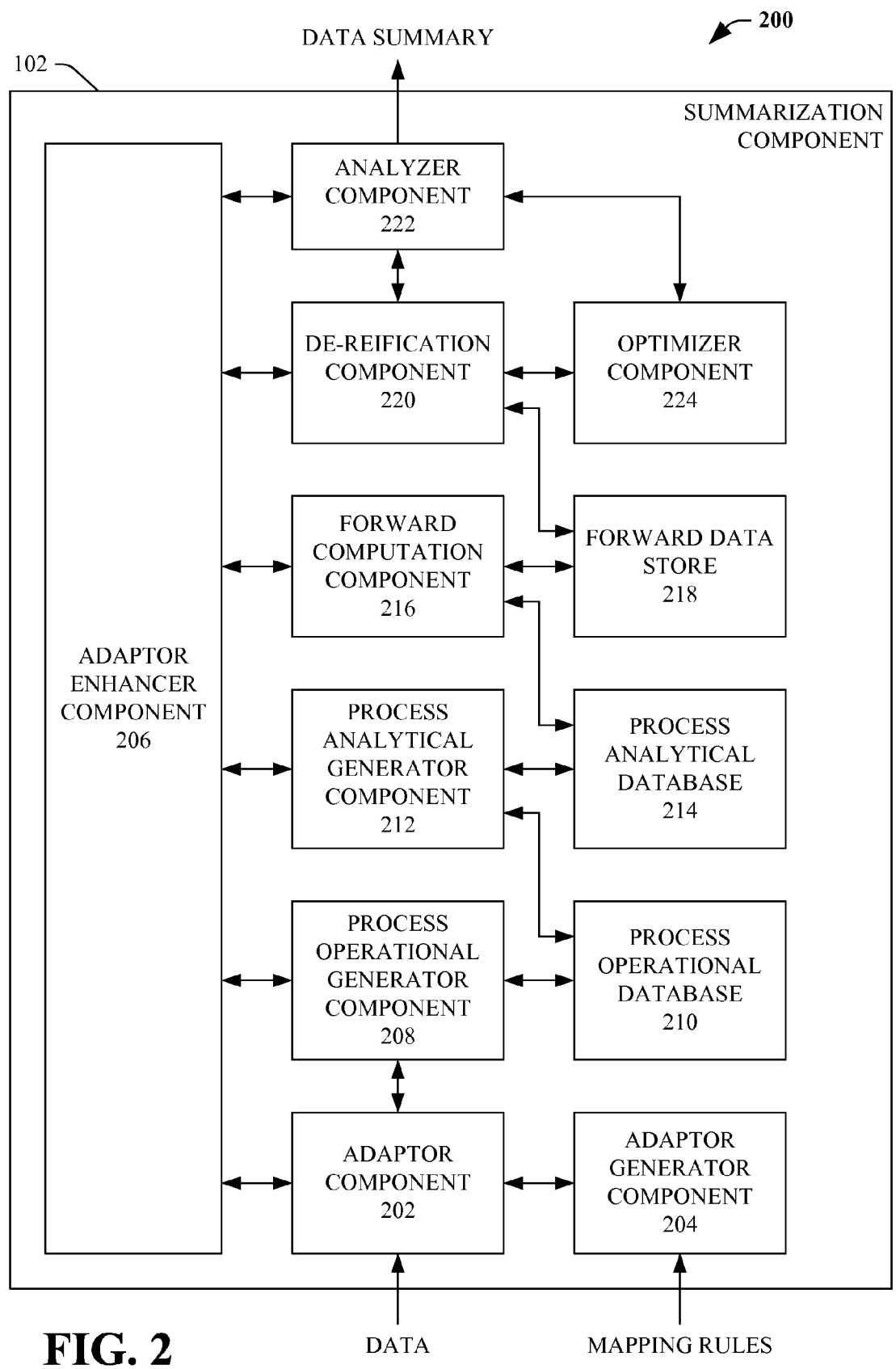
FIG. 2 depicts a block diagram of a system that can facilitate efficient summarization of data in accordance with an aspect of the disclosed subject matter.

Referring to FIG. 2, illustrated is a system 200 that can facilitate efficient summarization of data in accordance with an aspect of the disclosed subject matter. System 200 can include a summarization component 102 that can facilitate efficiently summarizing data, such as a large collection of data, based in part on predefined summarization criteria. The summarization component 102 can be the same or similar as, and/or can comprise the same or similar functionality as, respective components such as more fully described herein, for example, with regard to system 100.

The subject innovation can employ PDW technology that can utilize a relational database system to construct a process model as a hierarchy of relational tables and can use these tables for data analysis and summarization. In one embodiment, the system 200 can be a PDW that can perform data processing and summarization functions using relational representation of the process data by employing generic and portable SQL. It is to be appreciated that, while the disclosed subject matter is described herein with regard to SQL code, the subject innovation is not so limited, as the subject innovation can be ported or associated with virtually any RDBMS.

The summarization component 102 can receive the input data stream and can perform a multistage summarization of the received data in order to facilitate analyzing dynamic trends in the environment that produced the input data stream. In one aspect, the summarization schema can be based in part on a process model that can be represented as a state machine $S=(Q; \Sigma; \delta)$, where Q can be a set of states, $\Sigma$ can be a set of observable events or observations, and $\delta$ can be a set of possible associations between the states and observable events. The input data stream can be data that is generated by a wide class of data collecting applications. For example, input data streams can relate to stock market monitoring, drug studies, merchandise sales, fine granularity weather management, etc.

In one aspect, the summarization component 102 can include an adaptor component 202 that can facilitate efficiently mapping a received data stream to generate states and observations of interest associated with the input data stream based in part on predefined mapping rules. For instance, the adaptor component 202 can map the received data to a fixed number of states and a fixed number of observations of interest using the mapping rules. The mapping rules can define application-dependent states and observations of interest, and can assign symbolic state and observation names to logical constraints over the input data stream. Using the mapping rules, the adaptor component 202 can automatically generate data transformations for the input data stream to produce an output stream of states and observations of interest associated with the input data stream. By tuning specific mapping, the adaptor component 202 can select a desired (e.g., optimal) summarization schema, which can take into account accuracy of the model, size of the PDW (e.g., summarization component 102), complexity of the query processing and/or other predefined summarization criteria.

The mapping rules can be provided to the adaptor component 202 by an adaptor generator component 204. The adaptor generator component 204 can receive information from a user to facilitate generating the desired mapping rules. The mapping rules can be modified, as desired, to revise, add, replace, and/or remove, mapping rules. In accordance with an aspect, the summarization component 102 can include an adaptor enhancer module 206 that can monitor and evaluate the performance of various components (e.g. adaptor component 202) included in and/or associated with the summarization component 102 and can develop one or more mapping rules that can facilitate adaptively tuning the summarization component 102 to improve performance of the summarization component 102. The adaptor enhancer module 206 can provide the developed mapping rule(s) to the user to provide the user an option of modifying the current mapping rules to utilize the developed mapping rule(s), as desired, to facilitate improved performance of the summarization component 102.

For example, an application associated with weather measurement can provide an input data stream comprising a set of interdependent numeric data that can include correlated readings of cloudiness and temperature within a number of observation periods. Cloudiness can be measured in oktas. The adaptor component 202 can receive mapping rules that assign state names "cloud" and "sun" and observation names "cool" and "warm" to specific respective ranges of cloudiness and temperature. The logical constraints can be formed by any combination of comparison operators and logical connectors such as "and", "or", "not", etc. The adaptor component 202 can apply the mapping rules to the received input data stream to generate an output of states and observations of interest based in part on the input data stream and mapping rules, such as depicted in Table 1.

TABLE 1

Mapping input data stream into states and observations of interest.

| Input Data Stream | | | Stream of States and Observations | |
|---|---|---|---|---|
| Cloudiness | Temperature | Mapping Rules | States | Observations |
| 6 | 35 | States | cloud | cool |
| 7 | 40 | cloud: Cloudiness ≧ 5 | cloud | cool |
| 7 | 50 | sun: Cloudiness < 5 | cloud | warm |
| 2 | 60 | Observations | sun | warm |
| 0 | 55 | cool: Temperature < 45 | sun | warm |
| 1 | 30 | warm: Temperature ≧ 45 | sun | cool |
| 7 | 25 | | cloud | cool |
| 1 | 20 | | sun | cool |

The above example in Table 1 can correspond to a state machine with Q={cloud, sun}, Σ={cool, warm}, δ={(cloud, cool), (cloud, warm), (sun, cool), (sun, warm)}. This process is able to produce an observed event cool in both states cloud and sun. A possible sequence of observable events can be: "cool, warm, cool". Possible state sequences that match this sequence of observations could be "cloud, sun, cloud", "sun, cloud, sun", or "sun, sun, cloud". It should be noted that based on the input data stream, those sequence of states are not equally likely to occur.

The subject innovation, employing the above approach, can provide a highly scalable declarative process analysis paradigm which can be efficiently implemented using a relational database system. The summarization component 102 can perform all data processing and summarization functions using relational representation of the process data with generic and portable SQL code, which can facilitate allowing system 200 to function as a highly scalable wide area network (WAN) service.

In accordance with an aspect, a process operational generator component 208 that can receive the output from the adaptor component 202 and can generate state/observation pairs that can be extracted from the input data stream, state-to-state transitions that can be extracted from the state/observations pairs, and initial states, which can be states at the start of processing monitoring periods, associated with the input data stream. The process operational generator component 208 can generate a specified number of relational tables that can store respective information output from the process operational generator component 208, and the relational tables can be stored in a process operational database 210. For instance, the process operational generator component 208 can generate an all_states table that can include information representing states generated by the adaptor component 202 from the input data stream; an all_observations table that can contain information that can represent observations generated by the adaptor component 202 from the input data stream; a st_observ table that can include information that can represent all state-observation pairs extracted from the input data stream; a st_trans table that can include information that can represent all state-to-state transitions extracted from the st_observ table, wherein a state-to-state transition can be a pair of state names (st1, st2) such that st2 can occur immediately after st1 in two consecutive records of the st_observ table; and an init_states table that can include information regarding states associated with the input data stream at the start of the process monitoring periods.

To continue with the previous weather example, Table 2 includes SQL code that can facilitate creating and populating the PODB tables and data resulting from applying the SQL code, wherein st can represent states and obs can represent observations.

TABLE 2

Relational representation of the states and observations in PODB.

| SQL Code | Data | | |
|---|---|---|---|
| create table all_states | st | description | |
|   (st char(5), | cloud | "Cloud ≧ 5" | |
|   description char (20), | sun | "Clear < 5" | |
|   primary key (st) ); | | | |
| create table all_observations | obs | description | |
|   (obs char(5), | cool | "Temp < 45" | |
|   description char (20), | warm | "Temp ≧ 45" | |
|   primary key (obs) ); | | | |
| create table st_observ | st | obs | |
|   (st char(5) NOT NULL, | cloud | cool | |
|   obs char(5) NOT NULL, | cloud | cool | |
|   foreign key (st) references all_states, | cloud | warm | |
|   foreign key (obs) references all_observations); | cloud | warm | |
| | sun | warm | |
| | sun | warm | |
| | sun | cool | |
| | cloud | cool | |
| | sun | cool | |
| create table st_trans | src | dest | |
|   (src char(5) NOT NULL, | cloud | cloud | |
|   dest char(5) NOT NULL, | cloud | cloud | |
|   foreign key (src) references all_states, | cloud | sun | |
|   foreign key (dest) references all_states); | sun | sun | |
| | sun | sun | |
| | sun | cloud | |
| | cloud | sun | |
| | cloud | cloud | |
| create table init_states | st | | |
|   (st char(5), | cloud | | |
|   foreign key (st) references all_states); | cloud | | |
| | sun | | |
| | sun | | |
| | cloud | | |
| | cloud | | |

Information in the PODB can be utilized to facilitate generating a PADB. The summarization component 102 also can include a process analytical generator component 212 that can generate initial state probabilities, state transition probabilities, and probability of associated state/observations pairs, associated with input data stream and based in part on information contained in the PODB, and these generated probabilities can be stored in respective relational tables in a process analytical database 214. For instance, the process analytical database 214 can comprise an init_prob table that can include information representing initial state probabilities, a trans_prob table that can contain information representing transition probabilities, and an obs_prob table that can include information representing the probability of associated state/observation pairs, associated with the input data stream.

To continue further with the weather example, Table 3 includes SQL code for generating and populating the init_prob table, trans_prob table, and obs_prob table, and results from applying the SQL code to the example data for the PODB from Table 2. St refers to states, obs refers to observations of interest and prob refers to probability.

TABLE 3

Creating and loading Process Analytical Database.

| SQL Code | Data | | |
|---|---|---|---|
| create table obs_prob | st | obs | prob |
| (st char(5), | cloud | cool | 0.75 |
| obs char(5), | cloud | warm | 0.25 |
| prob real NOT NULL DEFAULT 0, | sun | cool | 0.5 |
| primary key (st,obs) ); | sun | warm | 0.5 |
| insert into obs_prob | | | |
| select st_observ.st, obs, cast (count(*) as real) /total_cnt | | | |
| from st_observ, (select st, count(*) | | | |
| from st_observ | | | |
| group by st) as t(st, total _cnt) | | | |
| where st_observ.st = t.st | | | |
| group by st_observ.st, obs, total _cnt; | | | |
| create table trans_prob | | | |
| (src char(5), | | | |
| dest char(5), | src | dest | prob |
| prob real NOT NULL DEFAULT 0, | cloud | cloud | 0.6 |
| primary key (src, dest) ); | cloud | sun | 0.4 |
|  | sun | cloud | 0.5 |
| insert into trans_prob | sun | sun | 0.5 |
| select st_trans.src, dest, cast (count(*) as real) /total_cnt | | | |
| from st_trans, (select src, count(*) | | | |
| from st_trans | | | |

TABLE 3-continued

Creating and loading Process Analytical Database.

| SQL Code | Data | |
|---|---|---|
| group by src) as | | |
| t(src, total _cnt) | | |
| where st_trans.src = t.src | | |
| group by st_trans.src, dest, total_cnt; | | |
| create table init_prob | | |
| (st char(5), | st | prob |
| prob real NOT NULL DEFAULT 0, | cloud | 0.6666667 |
| primary key (st) ); | sun | 0.3333333 |
| insert into init_prob | | |
| select st, cast (count(*)as real) /total_cnt | | |
| from init_states, (select count(*) | | |
| from init_states) as | | |
| t(total_cnt) | | |
| group by st, total _cnt; | | |

The summarization component 102 also can include a forward computation component 216 that can calculate pre-computed combined probabilities associated with the input data stream to facilitate creating a forward table. The forward computation component 216 can utilize the information contained in the PADB tables stored in the process analytical database 214 to calculate the combined probability p(S1,S2, O), which can be the probability of transitioning from state S1 to state S2 resulting in an observation O, and can store the results of the combined probability in a forward table that can be contained in a forward data store 218.

To continue further with the weather example, employing SQL code, the forward computation component 216 can retrieve the information in the PADB tables stored in the process analytical database 214, and can calculate the combined probability (S1,S2,O). The forward computation component 216 can create and populate the forward table with the combined probability results from application of the SQL code, as illustrated in the example forward table of Table 4. St, obs, and prob are as described herein, and dest refers to destination.

TABLE 4

Pre-computing forward table.

| SQL Code | Data | | | |
|---|---|---|---|---|
| create table forward | | | | |
| (src char(5), | st | dest | obs | prob |
| dest char(5), | cloud | cloud | cool | 0.45 |
| obs char(5), | cloud | cloud | warm | 0.15 |
| prob real NOT NULL DEFAULT 0, | cloud | sun | cool | 0.2 |
| primary key (src,dest,obs) ); | cloud | sun | warm | 0.2 |
|  | init | cloud | cool | 0.5 |
| insert into forward | init | cloud | warm | 0.1666667 |
| select 'init', init_prob.st, obs_prob.obs, | init | sun | cool | 0.1666667 |
| init_prob.prob*obs_prob.prob | init | sun | warm | 0.1666667 |
| from init_prob, obs_prob | sun | cloud | cool | 0.375 |
| where init_prob.st = obs_prob.st | sun | cloud | warm | 0.125 |
| union | sun | sun | cool | 0.25 |
| select trans_prob.src, trans_prob.dest, | sun | sun | warm | 0.25 |
| obs_prob .obs, trans_prob . prob*obs_prob .prob | | | | |
| from trans_prob, obs_prob | | | | |
| where trans_prob.dest = obs_prob.st; | | | | |

In another aspect, the summarization component 102 can comprise a de-reification component 220 that can perform de-reification of observations utilizing information contained in the forward table to facilitate generating de-reified observation tables that can contain information relating to the combined probabilities for each observation obs. For instance, the de-reification component 220 can generate an init_obs table that can contain probabilities of the observation obs in all initial states and a tr_obs table that can contain combined probabilities of the observation obs resulting from transition between each pair of states.

The term "reification" specifies the act of making an explicit data representation for an abstract concept. Thus, reification can allow a database system to process an abstract concept as if it were ordinary data. In the subject innovation, the concept of observation is first ratified from an abstract level to a data level and represented as attribute values in the de-reification component 220. A database schema object (e.g., table) can be created for each observation in the database. In this way, the de-reification of the observation data is performed, since the next abstraction level following the data level is a database schema.

Continuing again with the weather example, as depicted in Table 5, the de-reification component 220 can employ SQL code that can facilitate performing de-reification of observations utilizing information contained in the forward table (e.g., of Table 4) to facilitate generating de-reified observation tables that can contain information relating to the combined probabilities for each observation obs. Src refers to source, and prob and dest are as described herein.

TABLE 5

Generating de-reified observation tables.

| SQL Code | Data | | |
|---|---|---|---|
| create table init_cool | | | |
| (prob real, | prob | | dest |
| dest char(5)); | 0.5 | | cloud |
| insert into init_cool | 0.1666667 | | sun |
| select prob, dest | | | |
| from forward | | | |
| where obs = 'cool' and src = 'init'; | | | |
| create table tr_cool | | | |
| (prob real, | prob | src | dest |
| src char(5), | 0.45 | cloud | cloud |
| dest char(5)); | 0.2 | cloud | sun |
| insert into tr_cool | 0.375 | sun | cloud |
| select prob, src, dest | 0.25 | sun | sun |
| from forward | | | |
| where obs = 'cool' and src <> 'init'; | | | |
| create table init_warm | | | |
| (prob real, | prob | | dest |
| dest char(5)); | 0.1666667 | | cloud |
| | 0.1666667 | | sun |
| insert into init_warm | | | |
| select prob, dest | | | |
| from forward | | | |
| where obs = 'warm' and src = 'init'; | | | |
| create table tr_warm | | | |
| (prob real, | prob | src | dest |
| src char(5), | 0.15 | cloud | cloud |
| dest char(5)); | 0.2 | cloud | sun |
| insert into tr_warm | 0.125 | sun | cloud |
| select prob, src, dest | 0.25 | sun | sun |
| from forward | | | |
| where obs = 'warm' and src <> 'init'; | | | |

In one aspect, performing probabilistic analysis over sequences of the observations can be equivalent to performing multiway joins over corresponding de-reified observation tables. The de-reified observation tables (e.g., init_obs table, tr_obs table) can be used to facilitate performing analysis of the input process data. The summarization component 102 can comprise an analyzer component 222 that can utilize information in the de-reified observation tables to compute probabilities of specified sequences of observations and the most likely sequence of states given a sequence of observations, for example. In accordance with an aspect, the summarization component 102 can facilitate reducing probabilistic analysis over sequences of the observations to performing multiway joins over corresponding de-reified observation tables.

For instance, with regard to calculating probabilities of a given sequence of observations, given a sequence of observations obs_1, obs_2, obs_3, . . . obs_n, where n can be virtually any integer number, the analyzer component 222 can compute the probability of this sequence, using, for example, a generic SQL query as follows:

```
select sum(p) as seqprob
from (select init_obs_1.prob*tr_obs_2.prob* tr_obs_3.prob* ...
*tr_obs_n.prob
    from init_obs_1, tr_obs_2, tr_obs_3... tr_obs_n
    where init_obs_1.dest=tr_obs_2.src and
    tr_obs_2.dest=tr_obs_3.src and ...
        ... and tr_obs_(n-1).dest=tr_obs_n.src) as t(p);
```

For instance, continuing with the weather example, as depicted in Table 6, employing SQL code, the analyzer component 222 can calculate the probability of an observation sequence cool, warm, cool using the information in the de-reified observation tables (e.g., as illustrated in Table 5). Seqprob refers to the result for the probability of the specified observation sequence.

TABLE 6

Relational expression for determining probability of an observation sequence

| SQL Code | Data |
|---|---|
| select sum(p) as seqprob | |
| from (select | |
| init_cool.prob*tr_warm.prob*tr_cool.prob | |
| from init_cool, tr_warm, tr_cool | seqprob |
| where init_cool.dest = tr_warm.src and | 0.15083333803340793 |
| tr_warm.dest = tr_cool.src) as t(p); | |

The analyzer component 222 also can determine the most probable sequence of states generating a sequence of observations. For instance, given a sequence of observations obs_1, obs_2, obs_3, . . . obs_n, where n can be virtually any integer number, the analyzer component 222 can compute the most probable sequence of states corresponding to these observations utilizing, for example, generic SQL code, as follows:

```
create view state_seq_prob(p, st_1, st_2, ..., st_n) as
(select init_obs_1.prob*tr_obs_2.prob* tr_obs_3.prob* ...
*tr_obs_n.prob,
    init_obs_1.dest, tr_obs_2.dest, ..., tr_obs_n.dest
    from init_obs_1, tr_obs_2, tr_obs_3... tr_obs_n
    where init_obs_1.dest=tr_obs_2.src and
    tr_obs_2.dest=tr_obs_3.src and ...
        ... and tr_obs_(n-1).dest=tr_obs_n.src);
select st_1, st_2, ..., st_n
from state_seq_prob
where p = (select max(p)
    from state_seq_prob);
```

Referring again to the weather example, as illustrated in Table 7, the analyzer component 222 can calculate probabilities to determine the most probable state sequence resulting in the observation sequence cool, warm, cool, wherein s1 refers to state 1, s2 refers to state 2, and s3 refers to state 3, of the state sequence.

TABLE 7

Relational expression for determining the most probable state sequence for given observations.

| SQL Code | Data | | |
|---|---|---|---|
| | s1 | s2 | s3 |
| create view state_seq_prob(p,s1,s2,s3) as (select init_cool.prob*tr_warm.prob*tr_cool.prob, init_cool.dest, tr_warm.dest, tr_cool.dest from init_cool, tr_warm, tr_cool where init_cool.dest=tr_warm. src and | cloud | sun | cloud |

TABLE 7-continued

Relational expression for determining the most probable state sequence for given observations.

| SQL Code | Data |
|---|---|
| tr_warm.dest=tr_cool. src) select s1, s2, s3 from state_seq_prob where p = (select max(p) from state_seq_prob); | |

In still another aspect, the analyzer component 222 can calculate the top most probable state sequences that match a sequence of observations with corresponding probabilities. Given a sequence of observations obs_1, obs_2, obs_3, . . . obs_n, where n can be virtually any integer number, the analyzer component 222 can compute the top n most probable sequences of states corresponding to these observations using, for example, a generic SQL code, as follows:

```
select top n p, st_1, st_2, ..., st_n
from state_seq_prob
order by p desc
```

Alternatively, as desired, the analyzer component 222 can perform the same function without re-using the state_seq_prob, which is the most probable sequence of states generating a sequence of probabilities, for example, by employing the following generic SQL code:

```
select top n p, st_1, st_2, ..., st_n
from (select init_obs_1.prob*tr_obs_2.prob* tr_obs_3.prob* ...
     *tr_obs_n.prob,
     init_obs_1.dest, tr_obs_2.dest, ..., tr_obs_n.dest
  from init_obs_1, tr_obs_2, tr_obs_3... tr_obs_n
  where init_obs_1.dest=tr_obs_2.src and
  tr_obs_2.dest=tr_obs_3.src and ...
     ... and tr_obs_(n-1).dest=tr_obs_n.src) as
         t(p, st_1, st_2, ..., st_n)
order by p desc;
```

To continue again with the weather example, the analyzer component 222 can calculate the top three most probable state sequences resulting in the observation sequence cool, warm, cool, using either of the two versions of SQL code, as depicted in Table 8.

TABLE 8

Determining top 3 most probable state sequences for given observations.

| SQL Code | Data | | | |
|---|---|---|---|---|
| | prob | s1 | s2 | s3 |
| select top 3 p, s1, s2, s3 from state_seq_prob order by p desc; | 3.7500001E-2 | cloud | sun | cloud |
| | 3.3750001E-2 | cloud | cloud | cloud |
| | 0.025 | cloud | sun | sun |
| select top 3 p, s1, s2, s3 from (select init_cool.prob*tr_warm.prob*tr_cool.prob, init_cool.dest, tr_warm.dest, tr_cool.dest from init_cool, tr_warm, tr_cool where init_cool.dest=tr_warm. src and tr_warm.dest=tr_cool.src) as t(p,s1,s2,s3) order by p desc; | prob | s1 | s2 | s3 |
| | 3.7500001E-2 | cloud | sun | cloud |
| | 3.3750001E-2 | cloud | cloud | cloud |
| | 0.025 | cloud | sun | sun |

In accordance with an aspect, the summarization component 102 can update a summary of data (e.g., relational synopses) by generating and maintaining an up-to-date data summary so that the data summary can be current and accurate. The update can be based on recently received data and/or modifications to the mapping rules, for example. The summarization component 102 also can effectively estimate non-obvious data trends associated with the collection of data to facilitate data-driven decision making.

In accordance with still another aspect, the summarization component 102 can include an optimizer component 224 that can facilitate optimizing data analysis using de-reified observation sequences. The optimizer component 224 can utilize information from the de-reified observation tables to optimize data analysis by pre-computing probabilities of observations sequences and corresponding state transitions in higher order tables. The optimizer component 224 can generate intermediate tables for each step of the sequence similar to the forward procedure. The cardinality of an intermediate table can be equal to the number of states. The optimizer component 224 can define intermediate tables as relational views and the process can be implemented via a chain of nested views that can correspond to each intermediate step. For example, the following SQL code can be a generic view definition seq_obs1_obs2 for an observation sequence obs1, obs2:

```
create view seq_obs1_obs2(prob,dest) as
  select sum(p) as prob, dst
```

-continued

```
from (select init_obs1.prob*tr_obs2
    from init _obs1, tr_obs2
    where init_obs1.dest=tr_obs2.src) as t(p,dst)
group by dst;
```

Using the seq_obs1_obs2 view, the optimizer component 224 can generate a seq_obs1_obs2_obs3 view that can correspond to an observation sequence obs1, obs2, obs3:

```
create view seq_obs1_obs2_obs3(prob, dest) as
select sum(p) as prob, dst
from (select seq_obs1_obs2.prob*tr_obs_3
    from seq_obs1_obs2, tr_obs_2
    where seq_obs1_obs2.dest=tr_obs2.src) as t(p,dst)
group by dst;
```

Referring again to the weather example, as depicted in Table 9, for the observation sequence cool, warm, cool, the optimizer component 224 can calculate the probability of the observation sequence cool, warm, cool using intermediate views for the observation sequence cool, warm, cool. Here, seqprob refers to the results of the probability of the observation sequence cool, warm, cool using intermediate views for the observation sequence cool, warm, cool

TABLE 9

Using intermediate views for observation sequence cool, warm, cool.

| SQL Code | Data |
|---|---|
| create view seq_cool_warm(prob,dest) as<br>select sum(p), dst<br>    from<br>    (select init _cool .prob*tr_warm.prob,<br>        tr_warm.dest<br>    from init_cool, tr_warm<br>    where init_cool.dest=tr_warm.src) as t(p,dst)<br>group by dst | |
| create view seq_cool_warm_cool(prob,dest) as<br>select sum(p), dst<br>    from<br>    (select seq_cool _warm.prob*tr _cool .prob,<br>        tr_cool .dest<br>    from seq_cool _warm, tr_cool<br>    where seq_cool _warm.dest=tr _cool. src)<br>as t (p,dst) group by dst<br>select sum(prob) as seqprob<br>from seq cool_warm_cool | seqprob<br>0.15083333938072133 |

To further optimize data analysis, the optimizer component 224 can materialize any of the intermediate views, which can further improve query performance. For example, with regard to the weather example, it can be desired to materialize the seq_cool_warm view, as illustrated in Table 10:

TABLE 10

Materializing seq_cool_warm view.

| SQL Code | Data |
|---|---|
| create table mat_seq_cool_warm<br>  (prob real NOT NULL DEFAULT 0,<br>  dest char(5), | |

TABLE 10-continued

Materializing seq_cool_warm view.

| SQL Code | Data | |
|---|---|---|
| primary key (dest) ); | prob | dest |
| | 9.6250005E-2 | cloud |
| insert into mat_seq_cool_warm | 5.4583333E-2 | sun |
|   select sum(p), dst | | |
|   from | | |
|     (select seq_cool_warm.prob*tr_cool .prob, | | |
|         tr_cool .dest | | |
|     from seq_cool_warm, tr_cool | | |
|     where seq_cool_warm.dest=tr_cool.src) | | |
|   as t(p,dst) group by dst | | |
| select * from mat_seq_cool_warm | | |

Using the intermediate views for the de-reified observation sequences, the optimizer component 224 can perform other desired data analysis. For example, as depicted in Table 11, with regard to the weather example, the optimizer component 224 can employ SQL code that can facilitate determining the most probable sequence of states that can produce an observation sequence cool, warm, cool in accordance with the Viterbi algorithm.

TABLE 11

Finding the most probable sequence of states for observation sequence cool, warm, cool.

| SQL Code | Data | | |
|---|---|---|---|
| select st1, st2, st3<br>from (select dest<br>    from init _cool<br>    where prob = (select max(prob)<br>        from init _cool)) as t1 (st1),<br>  (select dest<br>    from seq_cool _warm<br>    where prob = (select max(prob)<br>        from seq_cool _warm)) as t2 (st2),<br>  (select dest<br>    from seq_cool _warm _cool<br>    where prob = (select max(prob)<br>        from seq cool warm cool)) as t3(st3) | st1<br>cloud | st2<br>sun | st3<br>cloud |

Continuing further with the weather example, employing SQL code, the optimizer component 224 can determine both the most probable state_sequence and the corresponding probability value for an observation sequence cool, warm using de-reified observation table tr_obs to determine a source state at each sequence step.

The optimizer component 224, employing SQL code, also can use the tr_warm and tr_cool tables to facilitate determining the most probable sequence of states with corresponding probabilities for cool, warm, cool observation sequence. Stprob refers to the probability result for determining the most probable sequence of states with corresponding probabilities for the specified observation sequence.

TABLE 12

Determining probabilities of most probable state sequences.

| SQL Code | Data | | | |
|---|---|---|---|---|
| create view topst_cool_warm(stprob,st1,st2) as<br>select p1*tr_warm.prob, st1, st2<br>from (select prob,dest<br>    from init _cool<br>    where prob = (select max(prob)<br>        from init _cool)) as t1(p1,st1),<br>  (select dest<br>    from seq_cool _warm<br>    where prob = (select max(prob)<br>        from seq_cool _warm)) as t2(st2),<br>  tr_warm<br>where t1.st1 = tr_warm.src and tr_warm.dest = t2.st2 | stprob<br>3.7500001E−2 | st1<br>cloud | st2<br>sun | st1<br>cloud |
| create view topst_cool_warm_cool (stprob,st1,st2,st3) as<br>select topst _cool _warm.prob*tr _cool.prob, st1,<br>    st2, st3<br>from topst_cool_warm,<br>    tr_cool,<br>  (select dest<br>    from seq_cool _warm _cool<br>    where prob = (select max(prob)<br>        from seq_cool _warm _cool)) as t (st3)<br>where topst_cool_warm.st2 = tr_cool.src and<br>    tr_cool.dest = t.st3<br>select * from topst_cool_warm_cool | | | | |

Referring again to the adaptor enhancer module 206, the adaptor enhancer module 206 can facilitate optimizing performance of the summarization component 102 by monitoring, tracking, and/or evaluating the performance of functions by the various components (e.g., process operational generator component 208, process analytical generator component 212, analyzer component 222, etc.) to facilitate maintaining desirable efficiency with regard to time, cost, and accuracy of the process data analysis performed by the summarization component 102 on an input data stream. Based in part on the performance evaluation of the summarization component 102, the adaptor enhancer module 206 can develop mapping rules, which can be recommended to a user for implementation, and/or can facilitate controlling materialization of higher-order de-reified sequence views.

For instance, the mapping rules can control the number of states and observations considered by the summarization component 102. With regard to the weather example, the mapping rules included the states of cloud and sun and the observations included cool and warm. A modification can be made to the mapping rules, for example, to increase the number of states and observations in the weather data stream, as follows:

| States |
|---|
| cloud: Cloudiness ≧ 7 |
| part _cl: 3 ≦ Cloudiness < 7 |
| sun: Cloudiness < 3 |
| Observations |
| cold: Temperature < 25 |
| cool: 25 ≦ Temperature < 45 |
| warm: Temperature ≧ 45 | where part_cl can refer to partly cloudy. The increase in the number of states and/or observations can increase the complexity of the data summarization and analysis, can impact the overall performance of the system 200. The adaptor enhancer module 206 can facilitate optimizing a tradeoff between (1) time, cost, and complexity of the data analysis and (2) the number and size of higher-order de-reified sequence tables. The subject innovation can facilitate optimizing both the time utilized to perform data analysis and the time utilized to load the summarization component 102 with pre-computation of the de-reified observation tables (e.g. built time).

In accordance with an aspect, the summarization component 102 can facilitate generating summarization schema that can be independent of the source data dimensionality, and as a result the subject innovation can be highly scalable and applicable for a wide class of data management tasks. For example, potential uses can range from efficient data utilization in specialized data centers to Internet-scale data search and analysis engines. The subject innovation can enable efficient data summarization and analysis over very large data sets. For instance, system 200 can be employed to explore the most and least probable dynamic scenarios in complex processes that generate large amounts of raw data. As an example, there can be a drug study process associated with large-scale data collecting activities. System 200, employing the summarization component 102, can perform dynamic analysis of the process beyond simple static summaries, such as "an improvement occurred in most of the patients from a controlled group in one month." For instance, the system 200 can perform an analysis that can include estimating complex scenarios in patient development, such as "it is most likely with probability of 0.8 that a two-week period of improvement in a patient condition will be followed by a three-day period of increase in blood pressure, after which the patient will start feeling better up to complete recovery in ten days. However, there is also a less probable scenario, with a probability of 0.2, with no indication of improvement for three weeks followed by considerable aggravation in the patient's condition." The subject innovation can be utilized in many other application domains, such as, for example, genome data analysis, market data monitoring, natural disasters, structural health data analysis, etc. At the same time, the subject innovation can be scaled up to extremely high data loads processing large amounts of raw data and performing thousands of concurrent requests to facilitate improved efficiency with regard to data analysis and summarization, as compared to conventional data warehousing systems and methods.

The subject innovation can provide improved efficiency in performance for summarizing data (e.g., large collections of data), as compared to conventional data warehouse systems or methods. Experiments were performed on the PDW (e.g., system comprising the summarization component 102), and in a first set of experiments, the PDW build time was measured while changing number of states and observations. The build time is the time necessary to create the forward table and all de-reified observation tables. During this set of experiments, the number of states ranged from 3 to 50 and the number of observations ranged from 1 to 50. The results demonstrated that build time can increase with increase in both the number of observations and the number of states. Both variables appear to have a relatively equal influence on the build time, which can effectively range from the 400 ms range at the (1,3) point to the 6 second range at (50,50) point. Some random spikes in build time also were observed, where such spikes can be attributed to pseudo-random variables in the computer running the simulations. In sum, the observed build time was reasonably small and appeared to change relatively linearly with system complexity (e.g. number of states and observations).

The PDW was also tested in a non-optimized configuration, where the data analysis queries were performed using de-reified observation tables only. Optimization with de-reified sequence tables was not performed. During this trial, the sequence length was varied from 3 to 5, the number of observations was varied from 1 to 50, and the number of states was varied from 1 to 25. The results demonstrated that, when the sequence length was 3, the execution time was relatively small and it did not change significantly. The shortest query execution time was found to be 0.015625 seconds and the longest query execution time was found to be 0.1875 seconds. The time changes increased with sequence length of 4, where the shortest query execution time was 0.03125 seconds and the longest query execution time was 2.640625 seconds. A sharp increase in execution time was observed around the point of sequence length=4 and number of states=8. Prior to this point, the system reaction to the increasing number of states and observations was negligible. When the sequence length=5, the query execution time became quite considerable. For instance, in the case of 50 observations and 25 states, the response time goes up to 58 seconds. It was also observed that increase in the execution time depended less on the number of observations comparing to the number of states.

Another set of experiments was performed utilizing the optimizer component 224. First, data analysis queries were performed without materializing intermediate views for de-reified observation sequences. To impose a considerable load on the PDW system, observation sequence length was varied from 2 to 30. The number of observations was varied from 2 to 102 in increments of 10. It was observed that even for an extremely high load with a hundred of states and observations and with the observation sequence length of 30, the query execution time average was approximately 1.5 seconds and did not exceed 5 seconds. The query time depended primarily on the number of states and the sequence length; it was relatively independent of the number of observations.

In still another set of experiments, data analysis queries were performed with materialization of intermediate views for de-reified observation sequences. To better illustrate the effect of view materialization, the observation sequence length was varied from 2 to 62. The number of observations was also varied from 2 to 102 in increments of 10. It was observed that, even with the highest system loads, the materialization time ranged from 20 to 40 seconds. Taking into account that the materialization typically can be performed offline, these results indicate high utility of the PDW system (e.g., system 200). For all the cases outlined above for this experiment set, the query execution time was under 0.1 seconds, regardless of how large the number of observations, number of states, or sequence length was. Thus, the subject innovation is capable of extremely high performance and scalability.

Referring again briefly to the process operational database 210, process analytical database 214, and forward data store 218, the process operational database 210 and process analytical database 214 each can be stored in a data store or respective data stores, as desired, and the forward data store 218 can be a data store. A data store employed in system 200 can comprise, for example, volatile memory and/or nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which can act as external cache memory, for example. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

It is to be appreciated and understood that in addition to the functionality of the summarization component 102, as desired, a probabilistic component (not shown) can be employed to capture certain behaviors associated with data. The probabilistic component can use different formalisms, such as probabilistic grammars and languages, and/or Hidden Markov Models (HMMs), for example. It is to be further appreciated and understood that straightforward implementations of such formalisms may not scale for complex process analysis with large numbers of states and observations, or for long observation sequences.

Figure 3:
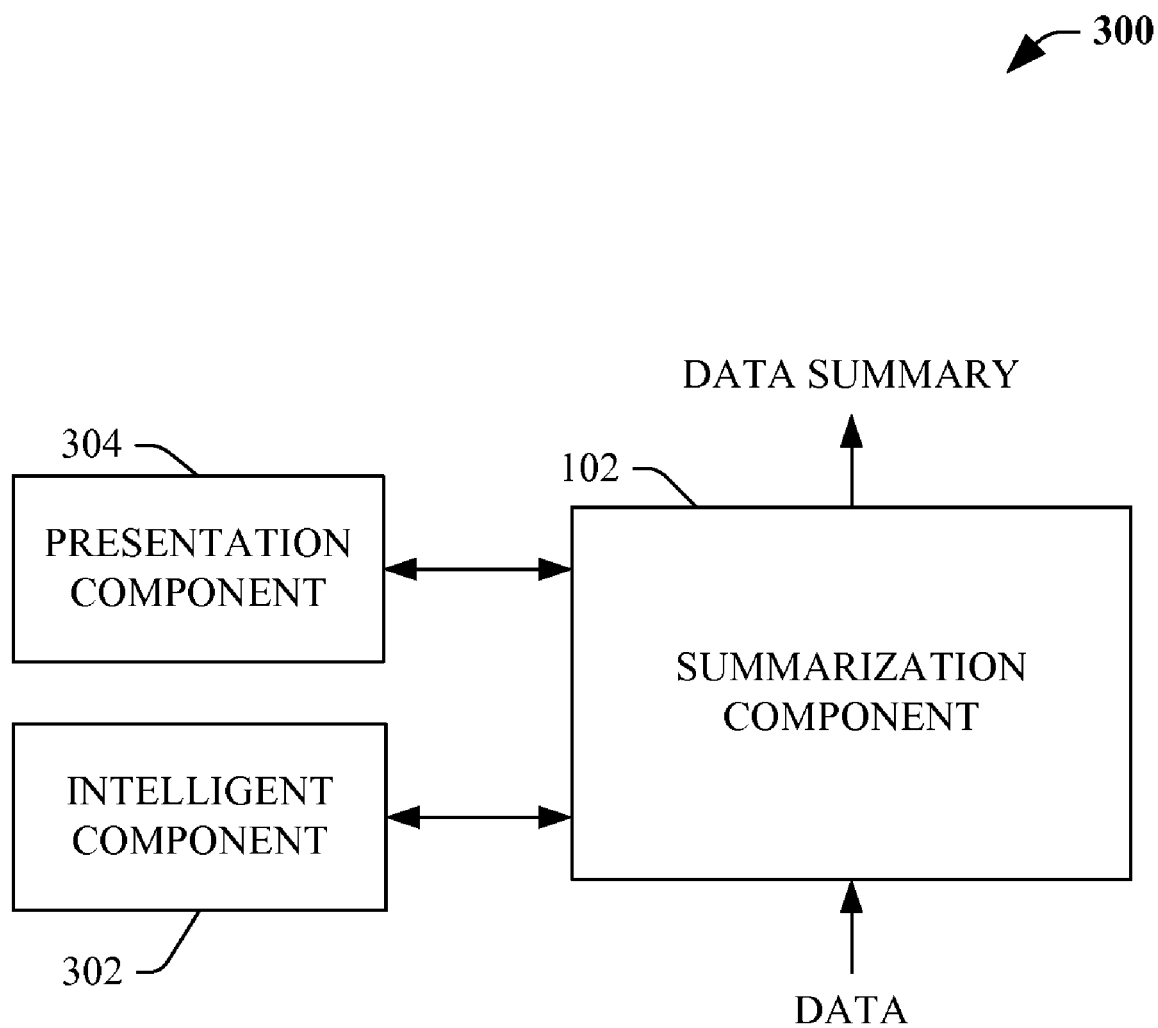
FIG. 3 depicts a block diagram of a system that can employ intelligence to facilitate summarization of a collection of data in accordance with an embodiment of the disclosed subject matter.

FIG. 3 illustrates a system 300 that can employ intelligence to facilitate summarizing data in accordance with an aspect of the disclosed subject matter. The system 500 can include a summarization component 102, wherein it is to be appreciated that the summarization component can be the same or similar as, and/or can have the same or similar functionality as, respective components such as more fully described herein, for example, with regard to system 100 and/or system 200.

In one aspect, the system 300 can further include an intelligent component 502. The intelligent component 302 can be utilized by the summarization component 102 to facilitate analyzing and summarizing data, such as large collections of data. For instance, the intelligent component 302 can analyze current and/or historical information associated with the summarization component 102 and/or received input data streams and can determine and/or infer a particular mapping rule(s) that can be employed to improve summarization of received data, whether and/or to what extent de-reified observation sequences should be used for data analysis to summarize a set of data, etc. Based in part on current and/or historical information, the intelligent component 302 also can infer whether an automated function associated with the summarization component 102 is to be performed.

For example, the summarization component 102 can be utilizing a set of mapping rules whereby two different states and two different observations of interest can be monitored and analyzed. The intelligent component 302 can analyze current and/or historical information, and based in part on such information, can infer that the mapping rules can be modified to facilitate analyzing more or less than two different states and/or more or less than two different observations of interest, while still maintaining a desired level of efficiency. The intelligent component 302 can communicate this inference to the summarization component 102, which can provide the modified mapping rule to a user for consideration and/or implementation by the summarization component 102.

It is to be understood that the intelligent component 302 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 300 can also include a presentation component 304 that can provide various types of user interfaces to facilitate interaction between a user and the summarization component 102 and/or any component coupled thereto. As depicted, the presentation component 304 is a separate entity that can be utilized with the summarization component 102. However, it is to be appreciated that the presentation component 304 and/or similar view components can be incorporated into the summarization component 102, a stand-alone unit, and/or a suitable combination thereof. The presentation component 304 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled with, incorporated into, and/or associated with the summarization component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 4-7 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
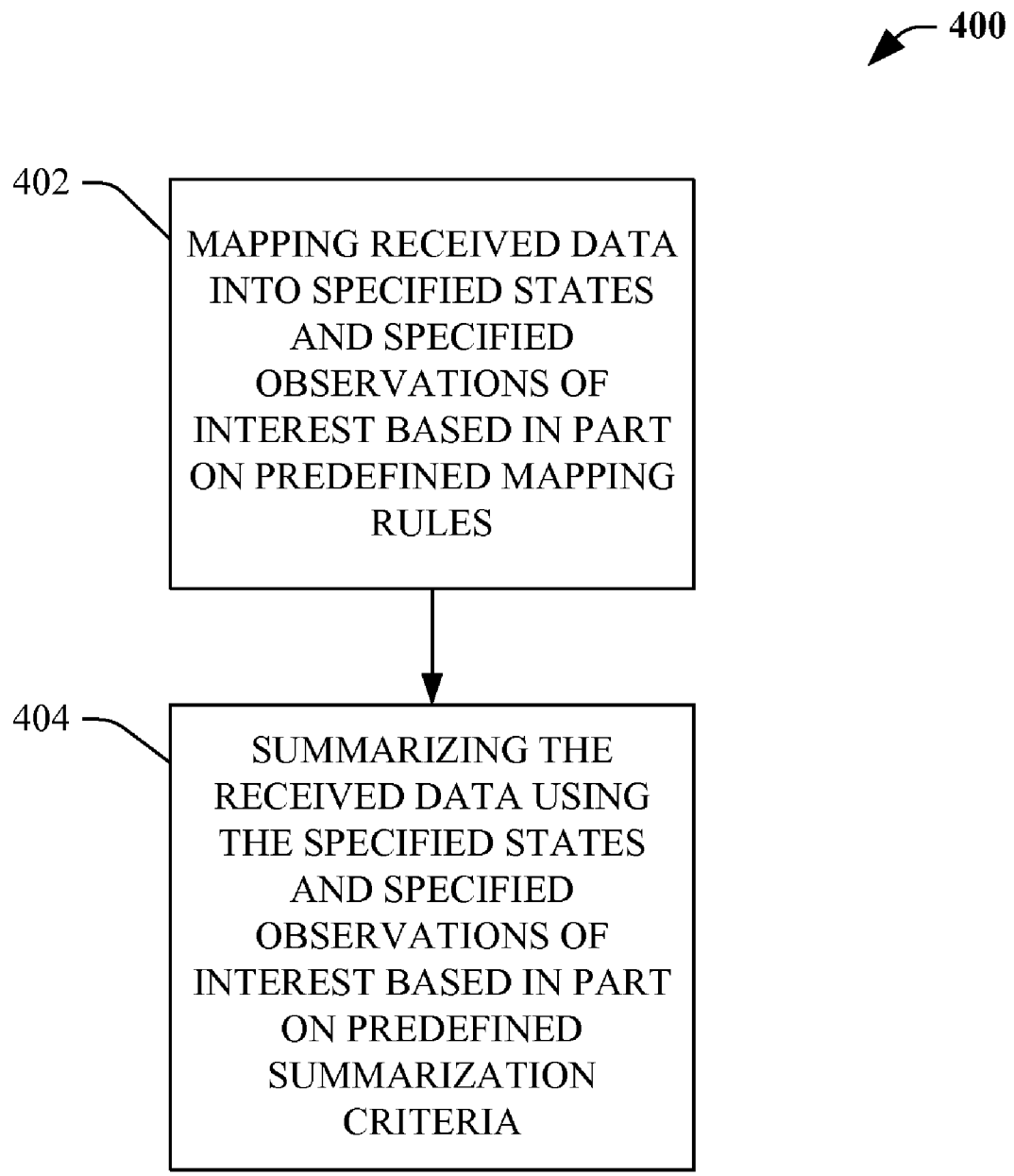
FIG. 4 is a representative flow diagram illustrating a methodology that can facilitate summarizing data in accordance with an aspect of the disclosed subject matter.

Turning now to FIG. 4, depicted is a methodology 400 that can facilitate summarizing data in accordance with an aspect of the disclosed subject matter. At 402, received data can be mapped into specified states and specified observations of interest based in part on predefined mapping rules. In one aspect, the summarization component 102 can receive an input data stream, which can be associated with a large collection of data, for example. The summarization component 102 can comprise an adaptor component 202 that can utilize mapping rules to map the received input data stream into specified states and specified observations of interest based in part on the predefined mapping rules. The mapping of the received data can facilitate efficient summarization of the received data.

At 404, the received data can be summarized using the specified states and specified observations of interest based in part on predefined summarization criteria. In an aspect, the summarization component 102 can create a process operational database that can include relational tables (e.g., all_states table, all_observations table, st_observ table, st_trans table, init_states table), where the information contained in the relational tables can be based in part on the output (e.g., specified states, specified observations of interest) generated by mapping the received data. The summarization component 102 can also create a process analytical database that can comprise relational tables (e.g., init_prob table, trans_prob table, obs_prob table) based in part on information associated with the received data, such as information contained in the process operational database. The summarization component 102 can use information in the process analytical database to create a forward table that can represent pre-computed combined probabilities. Information contained in the forward table can be utilized to perform de-reification of observations where de-reified observation tables (e.g. init_obs table, tr_obs table) can be generated to facilitate data analysis and summarization. The data analysis and summarization related to the received data can be performed using the de-reified observation tables. As desired, the data analysis and summarization can be further optimized by using de-reified sequences (also referred to as de-reified observation sequences) and/or materializing intermediate views that can be associated with the de-reified sequences based in part on predefined summarization criteria.

The predefined summarization criteria can relate to, for example, an amount of time associated with the data analysis, cost associated with the data analysis, complexity of the data analysis, the number and/or size of higher order de-reified sequence tables, the number of states, the number of observations of interest, the amount of data in the collection of data to be analyzed and summarized, the resources available (e.g., processing power available) for performing the data analysis, accuracy of the model, size of the PDW (e.g., summarization component 102), complexity of the query processing, etc. At this point, methodology 400 can end.

Figure 5:
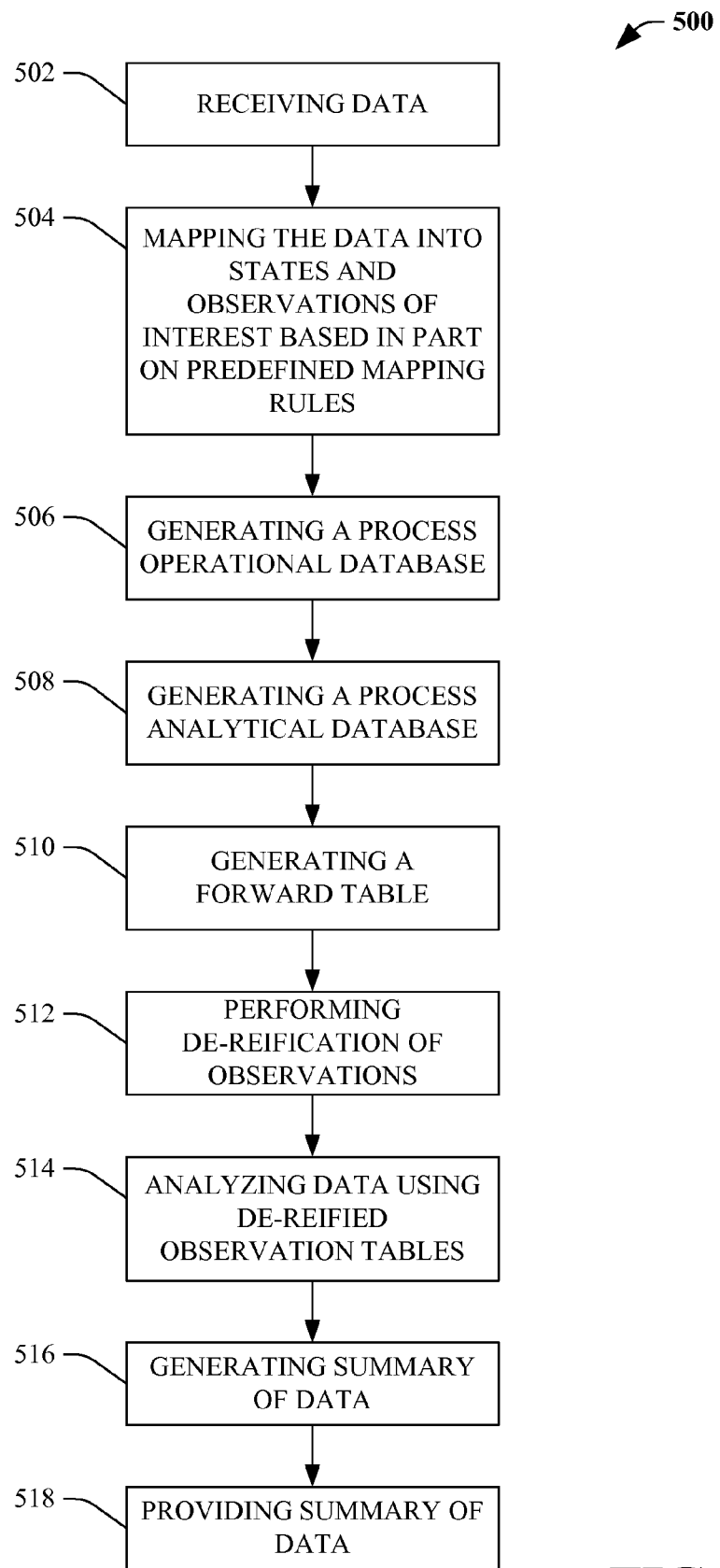
FIG. 5 is a representative flow diagram depicting a methodology that can facilitate summarizing data in accordance with an aspect of the disclosed subject matter.

Referring to FIG. 5, illustrate is a methodology 500 that can facilitate summarizing data in accordance with an aspect of the disclosed subject matter. At 502, data can be received. In one aspect, the summarization component 102 can receive data, such as an input data stream associated with a large collection of data. At 504, the received data can be mapped into states and observations of interest based in part on predefined mapping rules. In accordance with an aspect, an adaptor component 202 can receive the data and predefined mapping rules and can map the received data into states and observations of interest based in part on predefined mapping rules.

At 506, a process operational database can be generated. In accordance with an aspect, a process operational generator component 208 can receive information associated with the received data, such as information regarding the states and observations of interest associated with the data, and can generate and populate relational tables based in part on the received information to facilitate summarizing the received data. For instance, the process operational generator component 208 can create relational tables, such as an all_states table that can include information representing states generated by the adaptor component 202 from the received data; an all_observations table that can include information that can represent observations generated by the adaptor component 202 from the received data; a st_observ table that can include information that can represent all state/observation pairs that can be extracted from the received data; a st_trans table that can include information that can represent all state-to-state transitions that can be extracted from the st_observ table, wherein a state-to-state transition can be a pair of state names (st1, st2) such that st2 can occur immediately after st1 occurs in two consecutive records of the st_observ table; and an init_states table that can include information regarding states at the start of the process monitoring periods.

At 508, a process analytical database can be generated. In accordance with an aspect, a process analytical generator component 212 can receive information associated with the received data, such as information in the relational tables generated by the process operational generator component 208. The process analytical generator component 212 can process the received information to generate relational tables, such as an init_prob table that can contain information that can represent the initial state probabilities associated with the input data stream; a trans_prob table that can include information that can represent the state transition probabilities associated with the input data stream; and an obs_prob table that can contain information that can represent the probability of associated state/observation pairs related to the input data stream.

At 510, a forward table can be generated. In one aspect, a forward computation component 216 can be employed to generate a forward table using information associated with the input data stream, such as information contained in the process analytical database (e.g., the init_prob table, trans_prob table, obs_prob table). The forward table can include information representing pre-computed combined probabilities associated with the input data stream, wherein the combined probability p(S1,S2,O) can be a probability of transitioning from state S1 to state S2 resulting in an observation O.

At 512, de-reification of observations can be performed. In an aspect, a de-reification component 220 can perform de-reification of observations by using information in the forward table and/or other information associated with the input data stream to determine, and generate de-reified observation tables that can contain information on, combined probabilities for each observation obs. For instance, the de-reified observation tables can include an init_obs table that can contain information regarding probabilities of the observations obs in all initial states and a tr_obs table that can contain information regarding the combined probabilities of the observations obs resulting from transition between each pair of states. As desired, de-reified observation sequences, based in part on the de-reified observation tables, can be employed to further optimize data analysis of the received data, such as more fully described herein.

At 514, the received data (e.g., input data stream) can be analyzed using the de-reified observation tables. In one aspect, the analyzer component 222 can perform data analysis using the de-reified observation tables to facilitate summarizing the received data. For instance, the analyzer component 222 can use the de-reified observation tables to compute probabilities of specific sequence of observations and the most likely sequence of states given a sequence of observations.

At 516, a summary of the data can be generated. For instance, the analyzer component 222 can generate the summary of the received data based in part on the data analysis performed using the de-reified observation tables. At 518, a summary of the data can be provided, for example, as an output. In accordance with an aspect, the analyzer component 222 can provide a data summary of the received data as an output based in part on the data analysis using the de-reified observation tables. At this point, methodology 500 can end.

Figure 6:
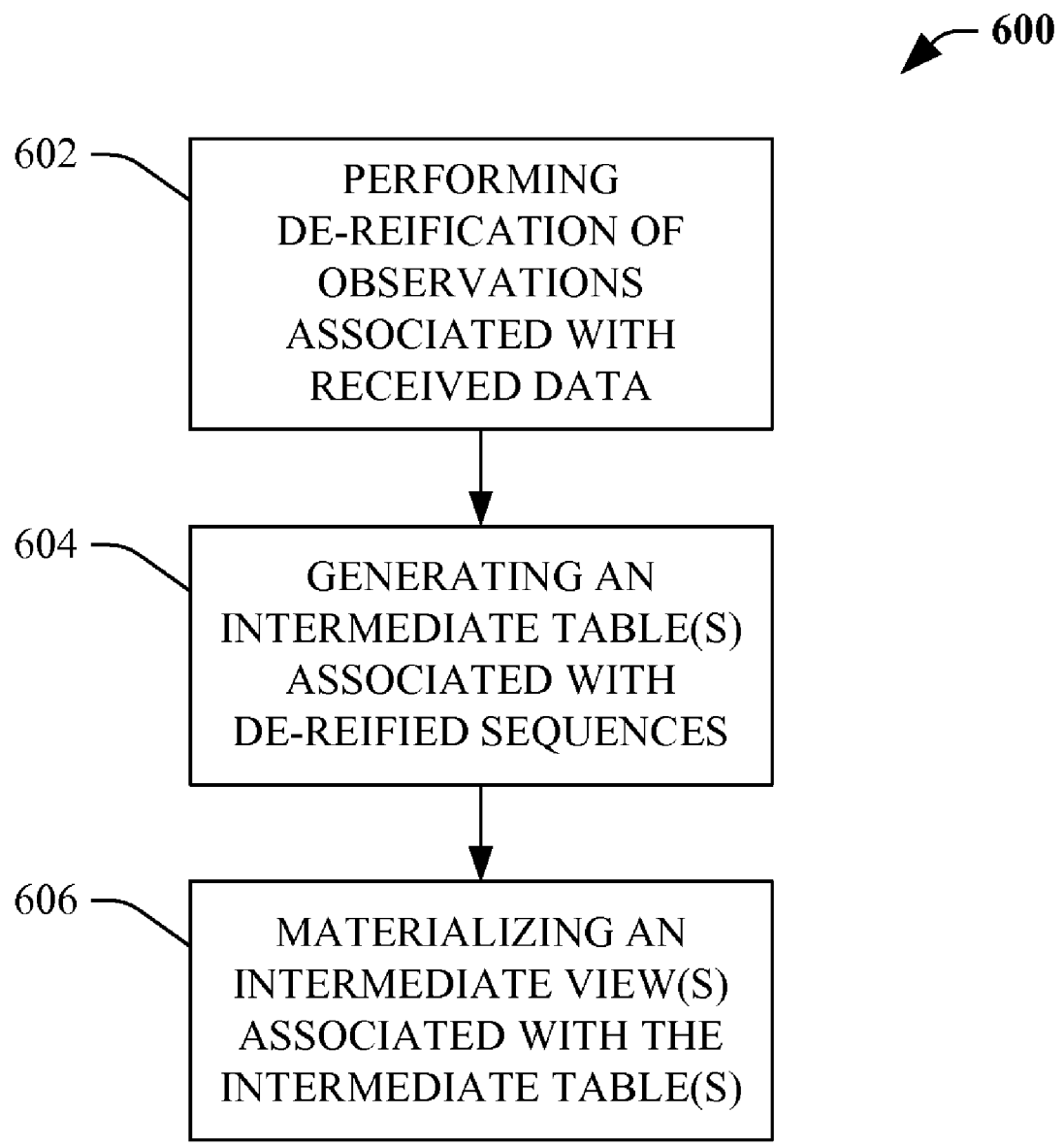
FIG. 6 is a representative flow diagram illustrating a methodology that can optimize data analysis of a collection of data to facilitate summarizing the collection of data in accordance with an aspect of the disclosed subject matter.

Turning to FIG. 6, illustrated is a methodology 600 that can optimize data analysis of a collection of data to facilitate summarizing the collection of data in accordance with an aspect of the disclosed subject matter. At 602, de-reification of observations associated with a received collection of data can be performed. For instance, an input data stream of a collection of data can be received by the summarization component 102. The summarization component 102 can facilitate mapping the received collection of data using predefined mapping rules. The summarization component 102 also can facilitate generating a process operational database based in part on the received collection of data. Using the process operation database, the summarization component 102 can generate a process analytical database, which can be utilized to create a forward table, such as more fully described herein. The forward table can be utilized to generate and populate de-reified observation tables that can be utilized to facilitate analyzing and summarizing the received collection of data.

At 604, one or more intermediate tables associated with de-reified sequences can be generated. In one aspect, the optimizer component 224 can facilitate further optimizing the data analysis of the received collection of data by pre-computing probabilities of observation sequences and corresponding state transitions in higher order tables. The optimizer component 224 can generate intermediate tables for each step of the sequence, where the cardinality of an intermediate table can be equal to the number of states. The intermediate tables can be defined as relational views (e.g. intermediate views) and the entire process can be implemented via a chain of nested views that can correspond to each intermediate step.

At 606, one or more intermediate views can be materialized. In one aspect, as desired (e.g. optionally), the optimizer component 224 can materialize one or more intermediate views, which can further improve query performance related to summarizing the received collection of data. At this point, methodology 600 can end.

Figure 7:
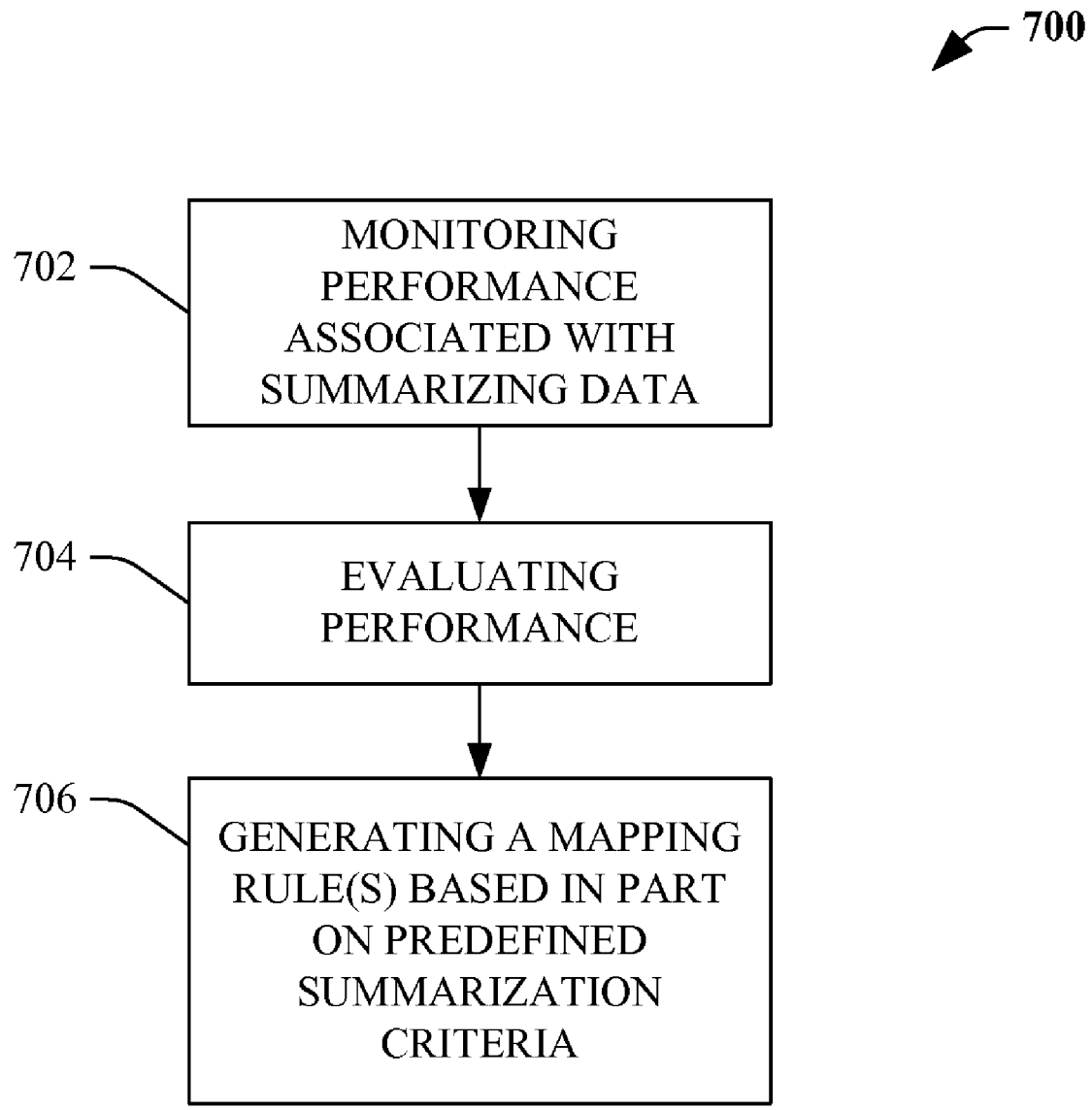
FIG. 7 is a representative flow diagram illustrating a methodology that can develop mapping rules to facilitate summarizing data in accordance with an aspect of the disclosed subject matter.

Turning to FIG. 7, depicted is a methodology 700 that can develop mapping rules to facilitate summarizing data in accordance with an aspect of the disclosed subject matter. At 702, performance associated with the summarization of received data can be monitored. In one aspect, an adaptor enhancer module 206 can monitor the performance of functions associated with summarizing received data (e.g., input data stream associated with a collection of data) by the summarization component 102, including its constituent components.

At 704, the monitored performance information can be evaluated to facilitate generating a mapping rule(s) that can be utilized to improve (e.g., optimize) data analysis and summarization of the received data. The adaptor enhancer module 206 can analyze and evaluate monitored information related to the performance of functions associated with summarizing received data, such as functions performed by the summarization component 102.

At 706, one or more mapping rules can be generated based in part on predefined summarization criteria. The adaptor enhancer module 206 can facilitate generating one or more mapping rules based in part on predefined summarization criteria. The predefined summarization criteria can relate to, for example, an amount of time associated with the data analysis, cost associated with the data analysis, complexity of the data analysis, the number and/or size of higher order de-reified sequence tables, the number of states, the number of observations of interest, the amount of data in the collection of data to be analyzed and summarized, the resources available (e.g., processing power available) for performing the data analysis, accuracy of the model, size of the PDW (e.g., summarization component 102), complexity of the query processing, etc. The one or more mapping rules can be provided to a user, and the user can modify the current set of mapping rules to employ the generated mapping rules, as desired.

For example, a current set of mapping rules can involve two states and two observations of interest. The adaptor enhancer module 206 can evaluate the performance of functions by the summarization component 102 with regard to received data and can determine that a new mapping rule, which can involve analyzing received data based on a specified number of states that is more or less than two states and/or a specified number of observations of interest that is more or less than two observations of interest, can provide improved summarization of received data, while still maintaining desired efficiency. The adaptor enhancer module 206 can provide the proposed new mapping rule(s) to the user via an interface, for example, and the user can determine whether to employ the new mapping rule(s). At this point, methodology 700 can end.

It should be appreciated that the methodologies disclosed herein and throughout this specification are capable of being stored on an article of manufacture to facilitate transporting and transferring such methodologies to computers. The term article of manufacture, as used herein, is intended to encompass a computer program accessible from any computer-readable device, carrier, or media.

It should also be appreciated that some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

Further, it has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
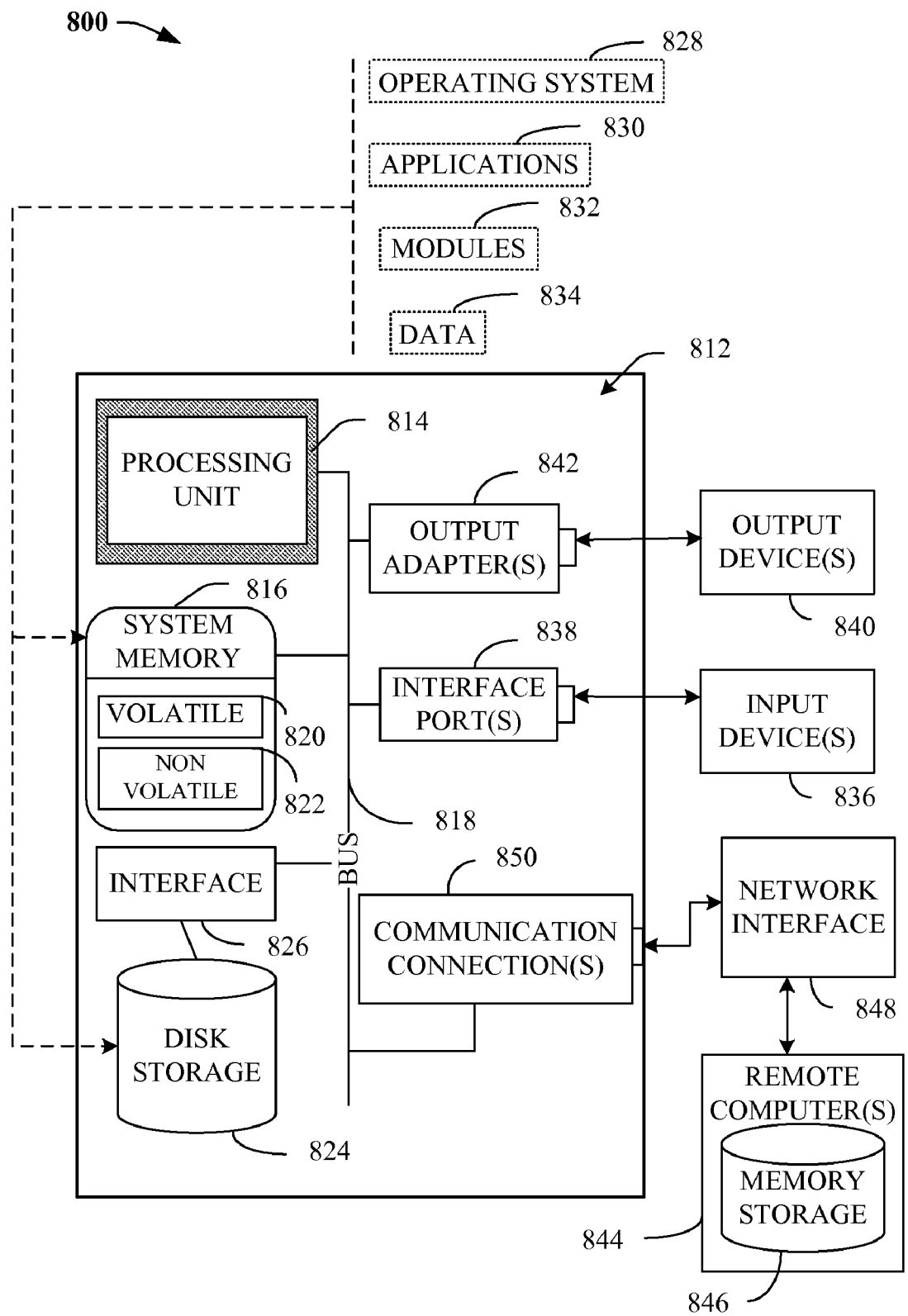
FIG. 8 is a schematic block diagram illustrating a suitable operating environment.
Figure 9:
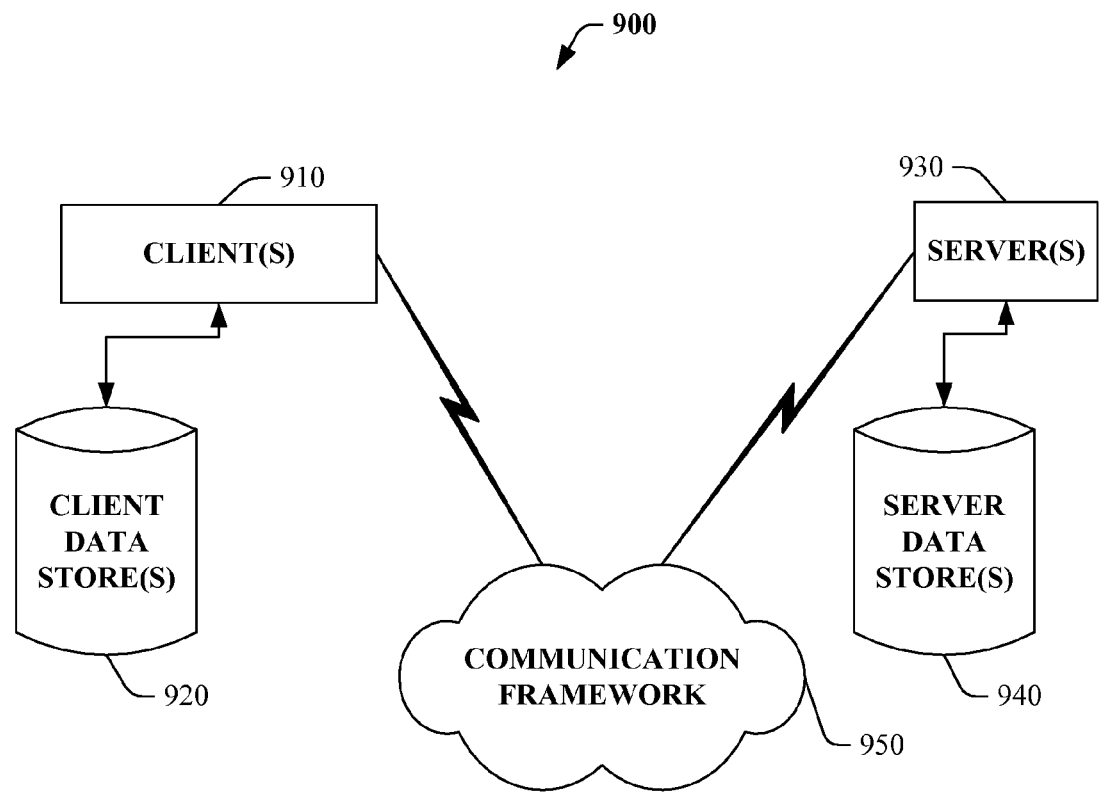
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 8, a suitable environment 800 for implementing various aspects of the claimed subject matter includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), or flash memory. Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 812 also includes removable/non-removable, volatile/non-volatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

It is to be appreciated that FIG. 8 describes software that acts as an intermediary between users and the basic computer resources described in the suitable operating environment 800. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the subject innovation can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing the subject innovation, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

As used in this application, the terms "component," "system," "store," "module," "interface," and the like can refer to a computer-related entity, either hardware, a combination of hardware and software, software, software in execution, and/or firmware. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over the other aspects or designs.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD . . . )), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible.

Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates summarization of data, comprising:
    at least one processor coupled to a memory, the processor executes:
    a summarization component that maps received data into specified states and specified observations of interest based in part on predefined mapping rules, and calculates probabilistic states, transitions, and observations associated with the specified states and the specified observations of interest to facilitate generation of a summary of the data based in part on predefined summarization criteria;
    a process operational generator that generates a process operational database that includes information derived based in part on the specified states and the specified observations of interest associated with the received data; and
    a process analytical generator that calculates probabilities associated with states, state transitions, and state/observation pairs based in part on information associated with the process operational database, and stores the calculated probabilities in a process analytical database.

2. The system of claim 1, further comprising:
    an adaptor enhancer module that monitors and evaluates performance of functions associated with summarization of the data and generates at least one mapping rule to facilitate adaptively tuning the performance of the summarization component.

3. The system of claim 1, the summarization component performs at least one update of the summary of the data to maintain accuracy of the summary of the data.

4. The system of claim 1, further comprising:
a forward computation component that generates a forward table that includes information that represents pre-computed combined probabilities calculated based in part on information associated with the process analytical database; and
a de-reification component that uses information included in the forward table to generate at least one de-reified observation table that includes information on combined probabilities for each observation associated with the received data to facilitate generation of the summary of the data.

5. The system of claim 4, further comprising:
an analyzer component that uses information included in the at least one de-reified observation table to compute probabilities of specific sequences of observations and a most likely sequence of states given a sequence of observations associated with the received data to facilitate generation of the summary of the data.

6. The system of claim 5, the analyzer component calculates at least one of a probability of a given sequence of observations, a most probable sequence of states generating a sequence of observations, or a top n most probable state sequences that match a sequence of observations with corresponding probabilities, wherein n is an integer number.

7. The system of claim 4, further comprising:
an optimizer component that uses de-reified observation sequences associated with information included in the at least one de-reified observation table and pre-computes probabilities of observation sequences and corresponding state transitions in higher order tables to facilitate optimizing data analysis related to summarization of the received data.

8. The system of claim 7, the optimizer component materializes at least one intermediate view associated with a de-reified observation sequence to facilitate improving query performance related to summarization of the received data.

9. The system of claim 1, the predefined summarization criteria relates to at least one of an amount of time associated with data analysis associated with summarization of data, cost associated with the data analysis, complexity of the data analysis, a number of higher order de-reified sequence tables, a size of higher order de-reified sequence tables, a number of states, a number of observations of interest, an amount of data to be analyzed and summarized, an amount of resources available to perform the data analysis, accuracy of a model, size of a process data warehouse, or complexity of query processing.

10. The system of claim 1, further comprising:
an intelligent component that renders an inference to facilitate performance of at least one automated function by the summarization component.

11. The system of claim 1, wherein the summarization component employs a Structured Query Language (SQL) framework to construct a relational representation of the received data.

12. The system of claim 1, wherein the summary of the data is generated based in part on a process model, wherein the process model is represented as a state machine.

13. A method that facilitates summarizing a collection of data, comprising:

storing computer executable instructions on a memory;
employing a processor that executes the computer executable instructions stored on the memory to implement the following acts:
mapping a received collection of data into specified states and specified observations of interest based in part on predefined mapping rules;
summarizing the received collection of data using the specified states and specified observations of interest based in part on predefined summarization criteria;
monitoring performance of functions associated with summarizing the received collection of data;
evaluating performance of functions associated with summarizing the received collection of data; and
generating at least one mapping rule to facilitate optimal summarizing of the received collection of data.

14. The method of claim 13, further comprising:
generating a process operational database based in part on the specified states and specified observations of interest;
generating a process analytical database based in part on information associated with the process operational database; and
generating a forward table based in part on information associated with the process analytical database.

15. The method of claim 14, further comprising:
performing de-reification of observations based in part on information associated with the forward table;
analyzing the received collection of data based in part on de-reification tables that include information associated with the de-reification of observations to facilitate summarizing the received collection of data; and
providing a summary of the received collection of data.

16. The method of claim 15, further comprising:
using de-reification sequences to facilitate analyzing the received collection of data; and
generating at least one intermediate table associated with the de-reification sequences.

17. The method of claim 16, further comprising:
materializing at least one intermediate view associated with the at least one intermediate table to facilitate improved query performance associated with analyzing and summarizing the received collection of data.

18. The method of claim 13, further comprising computing probabilities associated with at least one of a sequence of specified observations or a sequence of specified states given a sequence of specified observations.

19. A system that facilitates summarizing a collection of information, comprising:
at least one processor coupled to a memory, the processor executes:
means for mapping the collection of information into defined states and defined observations of interest based in part on predefined mapping rules;
means for summarizing the collection of information using the defined states and defined observations of interest based in part on predefined summarization criteria; and
means for performing de-reification of observations associated with the collection of information based in part on information associated with at least one generated relational table.

20. The system of claim 19, further comprising:
means for generating the at least one generated relational table using the defined states and defined observations of interest;
means for analyzing information associated with de-reification tables that include information regarding de-reification of observations associated with the collection of information to facilitate generating a relational synopses for the collection of information;

means for generating the relational synopses for the collection of information; and means for providing the relational synopses for the collection of information.

* * * * *